Patented Dec. 15, 1931

1,836,702

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

CARBAZOL ANTIOXIDANT

No Drawing.   Application filed October 18, 1928.   Serial No. 313,382.

This invention relates to processes of retarding or preventing the oxidation of organic substances, and more particularly to the compounds for retarding the oxidation and compositions containing the retardants. Such antioxidants have many uses in various industrial and commercial fields, such as for the preservation of oxidizable organic compounds and, more especially, for arresting deterioration of rubber compositions.

I have discovered that a series of compounds comprising carbazol and its derivatives have antioxidant properties which make them useful for the above described purposes. These compounds may be described as having the following generic formula:

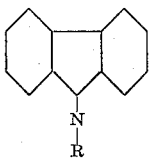

in which R represents hydrogen, alkyl, aryl or a substituted hydrocarbon group.

More specifically among the compounds falling within the class described may be mentioned carbazol, ethyl carbazol, acetyl carbazol, benzyl carbazol, etc. All of these substances as well as many others of the same type may be used successfully to retard or entirely prevent deterioration of organic compounds, such as rubber, due to oxidation.

The antioxidants described may be prepared according to any well known chemical processes of condensation or other treatment of organic compounds to obtain the desired end products. For instance, carbazol may be obtained from crude anthracene, in which it occurs, by fusion with potassium hydroxide; or it may be synthesized by conducting diphenylamine through tubes heated to redness. The alkyl carbazols may be prepared by heating the potassium carbazol with a suitable alkyl iodide. Carbazol and acid anhydrides yield another group of antioxidants falling within the present class. The present invention, of course, is not limited to any specific method of preparing the various antioxidant compounds.

To illustrate the effectiveness of these antioxidants, a series of tests were carried out in which standard vulcanizable rubber mixtures were made up, each mixture containing about 1% of one of the antioxidants. Each mixture was formed into sheets of uniform thickness and these sheets were vulcanized at 281° F. for thirty minutes. After vulcanization the sheets were cut up into test dumb-bell strips, and break tests were carried out on one or more of the test strips containing the various antioxidants. Others of the test strips were placed in an oxygen bomb which was maintained at a temperature of 70° C. for a period of three days under an oxygen pressure of three hundred pounds per square inch. After this oxygen treatment the treated dumb-bell strips were also submitted to the break tests.

The treatment in the oxygen bomb was used to simulate aging and to permit rapid determination of the effect of oxygen upon the rubber compositions, the results obtained corresponding approximately to what might be expected to take place in a much longer period of time in ordinary use of the rubber composition.

To serve as a check and standard of comparison, a rubber composition exactly similar to those described was made up and vulcanized under the same conditions, the rubber mixture in this case, however, containing no antioxidant. When this rubber mixture was tested in the oxygen bomb, it deteriorated completely after the described accelerated oxidation test. The rubber compound containing 1% of carbazol had a tensile strength, at break, of 2,850 pounds per sq. in. before aging and 1,325 pounds per sq. in. after aging. The rubber compound containing 1% ethyl carbazol had a tensile strength of 2,535 pounds per sq. in. before aging and 1,135 pounds per sq. in. after aging. Others of the compositions showed increasingly improved results as compared with the rubber compounds containing no antioxidant which completely deteriorated after the accelerated oxidation tests.

It is to be understood that many other substances falling within the general classification described may be used as antioxidants with effects similar to those set forth. Any suitable and desired changes may be made in proportions, compounds used, conditions of operation and other details without departing from the spirit and scope of the invention except as set forth in the appended claims.

I claim:

1. A rubber composition containing a compound having the following generic formula:

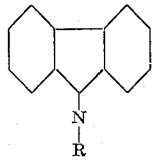

in which R represents hydrogen, alkyl, aryl or a substituted hydrocarbon group and containing no nitro group.

2. A rubber composition containing carbazol.

3. The process of retarding oxidation of an oxidizable organic compound which comprises mixing therewith a compound having the following generic formula:

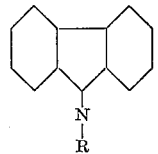

in which R represents hydrogen, alkyl, aryl or a substituted hydrocarbon group and containing no nitro group.

4. The process of retarding oxidation of an oxidizable organic compound which comprises mixing carbazol therewith.

5. The process of retarding oxidation of a rubber composition which comprises mixing therewith a compound having the following generic formula:

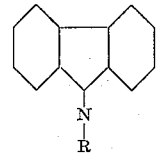

in which R represents hydrogen, alkyl, aryl or a substituted hydrocarbon group and containing no nitro group.

6. The process of retarding oxidation of a rubber composition which comprises mixing carbazol therewith.

In testimony whereof, I have hereunto subscribed my name this 16 day of October, 1928.

LUDWIG J. CHRISTMANN.